United States Patent [19]

Hehl

[11] Patent Number: 4,883,418
[45] Date of Patent: Nov. 28, 1989

[54] PLASTICS INJECTION MOLDING MACHINE

[76] Inventor: Karl Hehl, Arthur-Hehl-Str. 32, D-7298 Lossburg-1, Fed. Rep. of Germany

[21] Appl. No.: 252,124

[22] Filed: Oct. 3, 1988

Related U.S. Application Data

[63] Continuation-in-part of Ser. No. 116,218, Nov. 3, 1987, abandoned.

[30] Foreign Application Priority Data

Nov. 5, 1986 [DE] Fed. Rep. of Germany ....... 3637612

[51] Int. Cl.$^4$ .............................................. B29C 45/17
[52] U.S. Cl. ..................................... 425/217; 241/34; 241/101.4
[58] Field of Search ............... 241/3, 101.4, 73, 101.2, 241/100, 37.5, 34; 264/37; 425/215, 217, 216, 317, 589, 806, 298, 308

[56] References Cited

U.S. PATENT DOCUMENTS

| | | |
|---|---|---|
| 3,407,444 | 10/1968 | Rees . |
| 3,418,694 | 12/1968 | Straus . |
| 3,672,803 | 6/1972 | Rees . |
| 3,776,675 | 12/1973 | Veneria . |
| 4,321,027 | 3/1982 | Stoehr et al. . |
| 4,462,783 | 7/1984 | Hehl . |
| 4,608,008 | 8/1986 | Hehl . |
| 4,737,095 | 4/1988 | Hehl . |

FOREIGN PATENT DOCUMENTS 2534180 10/1982 France .
2567420 7/1984 France .
222505 12/1983 German Democratic Rep. .

Primary Examiner—Mark Rosenbaum
Attorney, Agent, or Firm—Foley & Lardner, Schwartz, Jeffery, Schwaab, Mack, Blumenthal & Evans

[57] ABSTRACT

The sorting means of the injection molding machine comprises a pivoted sorting plate, which is provided on opposite sides with sliding surfaces for separating unusable parts, such as rejects. By means of a motor-driven turning drive the sorting plate is pivotally movable between two mutually opposite inclined positions. The sorting means constitute a sorting unit, which is adapted to be inserted into and removed from the injection molding machine. A belt conveyor is associated with the sorting unit and also constitutes a unit which is adapted to be inserted into and removed from the injection molding machine. One sliding surface of the sorting plate terminates over the belt conveyor when the sorting plate is in one inclined position. The other sliding surface of the sorting plate terminates over a recycling space when the sorting plate is in its other inclined position. As a result, the injection molding machine can more readily be adapted to a desired injection and recycling process and to different desires of the customers as regards automation and their financial resources.

20 Claims, 17 Drawing Sheets

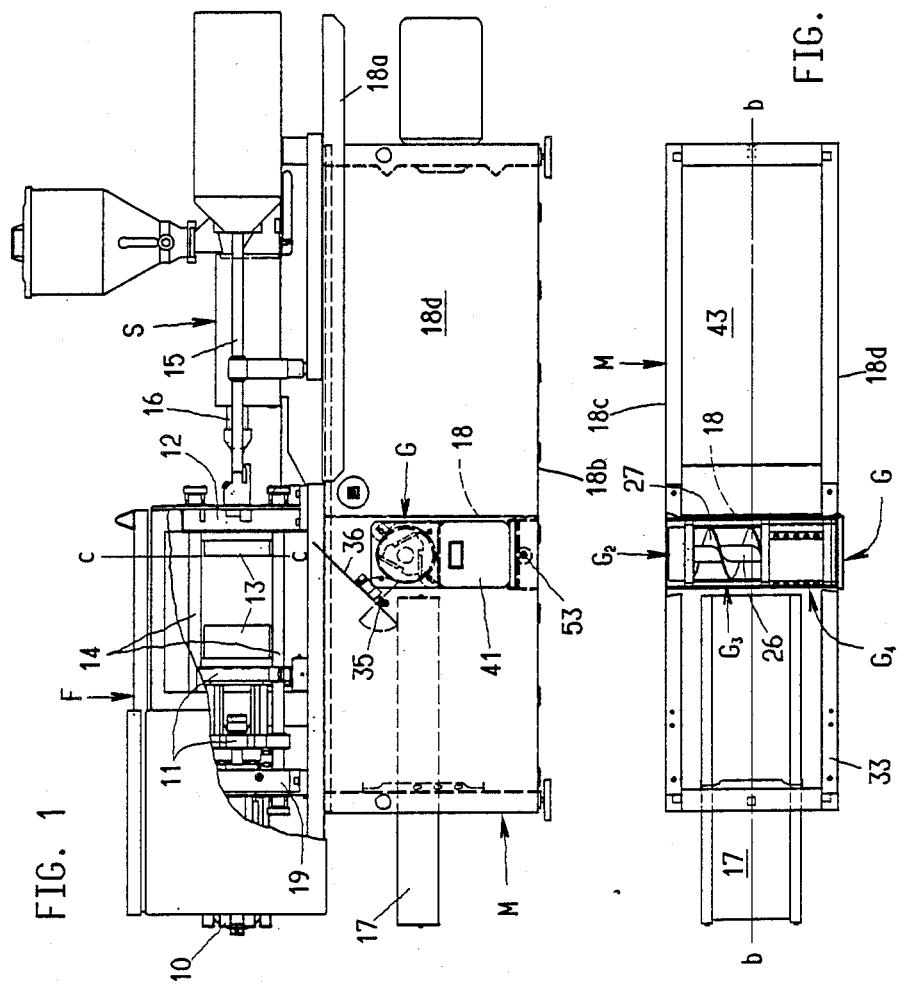

PLASTICS INJECTION MOLDING MACHINE

CROSS-REFERENCE TO RELATED APPLICATION

This is a continuation-in-part of application Ser. No. 116,218 filed Nov. 3, 1987 which has been abandoned.

BACKGROUND OF THE INVENTION

1. Field of the Invention

This invention relates to an injection molding machine comprising means for separating usable moldings from unusable parts. More particularly, the invention relates to such a machine which comprises an injection molding unit and a clamping unit, each of which units is mounted in a horizontal orientation on a pedestal which rests on an approximately rectangular undersurface. The machine further comprises an ejector for consecutively ejecting usable moldings and unusable parts, such as rejects and/or sprues, from the opened injection mold. The machine further comprises sorting means, which are accommodated in the pedestal under the injection mold and comprise a sorting plate, which is pivoted on a horizontal axis and is provided on opposite sides with sliding surfaces for spatially separating the unusable parts (rejects and sprues) from the usable moldings. The sorting means further comprise a motor-driven turning drive for pivotally moving the sorting plate in the interval of time between the ejection of the usable moldings and of the unusable parts in respective inclined positions, in which the sorting plate causes the usable moldings and the unusable parts to be separated in that they are respectively caused to slide down in mutually opposite directions on respective sliding surfaces of the sorting plate.

2. Description of the Prior Art

U.S. Pat. No. 3,776,675 discloses an injection molding machine which is of that kind and in which the pivotal axis 35 of the sorting plate extends in the plane of symmetry (b—b in FIG. 3) of the injection molding machine. As a result, the usable moldings and the unusable parts are conveyed out of the pedestal transversely to the plane of symmetry of the injection molding machine across respective longitudinal side walls of the pedestal. Additional space is required on the longitudinal sides of the pedestal for means for carrying off or for a further processing of the usable moldings and of the unusable parts. In case of trouble involving the sorting means, which are integrated in the pedestal, the operation cannot be resumed until the repair has been completed because the sorting means cannot be replaced by an operative replacement sorting means.

From U.S. Pat. No. 4,608,008 it is known to provide a belt conveyor in a unit which is removable from the pedestal of the machine and so to arrange such unit that the usable moldings can be moved out of the pedestal at one end in a direction which is parallel to the plane of symmetry of the injection molding machine. But the unusable parts cannot be separated because the vertical projection of the mold is within the conveying surface of the conveyor belt.

U.S. Pat. No. 4,321,027 discloses a relatively large injection molding machine, in which a three-part mold is employed and the rejects and sprues will anyway fall out of the three-part mold in an area which is spaced from the area in which the usable moldings drop out of the mold (loc. cit., lines 18 to 29 of column 1 and lines 32 to 38 of column 2). Because the parts are dropped at spaced apart locations there is no need for space-occupying additional means for separating the sprues. Such means are known from U.S. Pat. No. 3,776,675 mentioned above. But the provision of such means will be essential if a replaceable size reduction unit is to be used also in small or very small injection molding machines of various types and where simple injection molds are employed. This has not been possible thus far owing to a lack of space.

SUMMARY OF THE INVENTION

It is an object of the invention so to improve an injection molding machine which is of the type described first hereinbefore that the machine can more easily be adapted for carrying out different injection and recycling processes and to different desires of potential customers as regards automation and to the financial resources of such customers. To that end, various accessories, such as the sorting means and size reduction means, are constituted by respective units, which can readily be installed in case of need.

The object set forth hereinbefore is accomplished in that the sorting means consist of a unit, which is detachably mounted in and removable from the pedestal and comprises a housing and is mounted in the parallelepipedic pedestal in a position in which the pivotal axis of the sorting plate extends in the plane of symmetry of the injection molding machine, the sorting unit has associated with it a belt conveyor unit, which is detachably mounted in and removable from the pedestal and serves to convey the usable moldings in a direction which is parallel to the plane of symmetry of the machine, the conveying surface of said belt conveyor adjoins the sliding surface of said plate when it is in a "pass" position for ejecting usable moldings, and the downstream end of the sliding surface of said plate when it is in a "reject" position for ejecting unusable parts is disposed over a recycling space, which is defined by a transverse wall and adapted to receive a size reduction unit, which is slidably insertable into said recycling space transversely to the plane of symmetry of the injection molding machine.

That arrangement is also based on the recognition that whereas additional means (belt conveyor) are required for the endwise discharge of the usable moldings, that disadvantage will be offset by the fact that the injection molding machine is more highly adaptable to the needs of the customer in the sense stated above in connection with the object. Besides, the injection molding machine can more easily be provided with change decks attached to the rear longitudinal side of the pedestal. Such change decks are required for a replacement of injection molds or plasticizing cylinders and for an adaptation of the temperature of such parts before they are replaced, as is disclosed, e.g., in U.S. Pat. No. 4,462,783. Finally, the injection molding machine in accordance with the invention can more easily be incorporated in injection molding plants which include a plurality of injection molding machines, which are parallel to each other, and which plants comprise common means for transporting the injection molds and/or plasticizing cylinders during a replacement thereof, as is disclosed, e.g., in U.S. Pat. No. 4,737,095.

In such an arrangement the size reduction unit may more easily be used even in small or very small injection molding machines and in injection molding machines in which simple injection molds are employed and such injection molding machines may comprise sorting means as disclosed in U.S. Pat. No. 3,776,675.

Finally, the manufacture can be rationalized as regards stockkeeping and assembling because the sorting unit, the size reduction unit and the conveyor belt unit may be assembled, repaired and tested for their operative condition outside the injection molding machine. Besides, the size reduction unit may also be used as an independent size reduction machine outside the injection molding machine or may be used in different injection molding machine at different times.

BRIEF DESCRIPTION OF THE DRAWINGS

FIG. 1 is a side view of an injection molding machine according to a first embodiment of the invention;

FIG. 2 is a rear view of an injection molding machine according to the invention;

FIG. 3 shows the machine pedestal of the injection molding machine according to FIG. 1, in plan view;

DETAILED DESCRIPTION OF THE PREFERRED EMBODIMENTS

Figure 4:
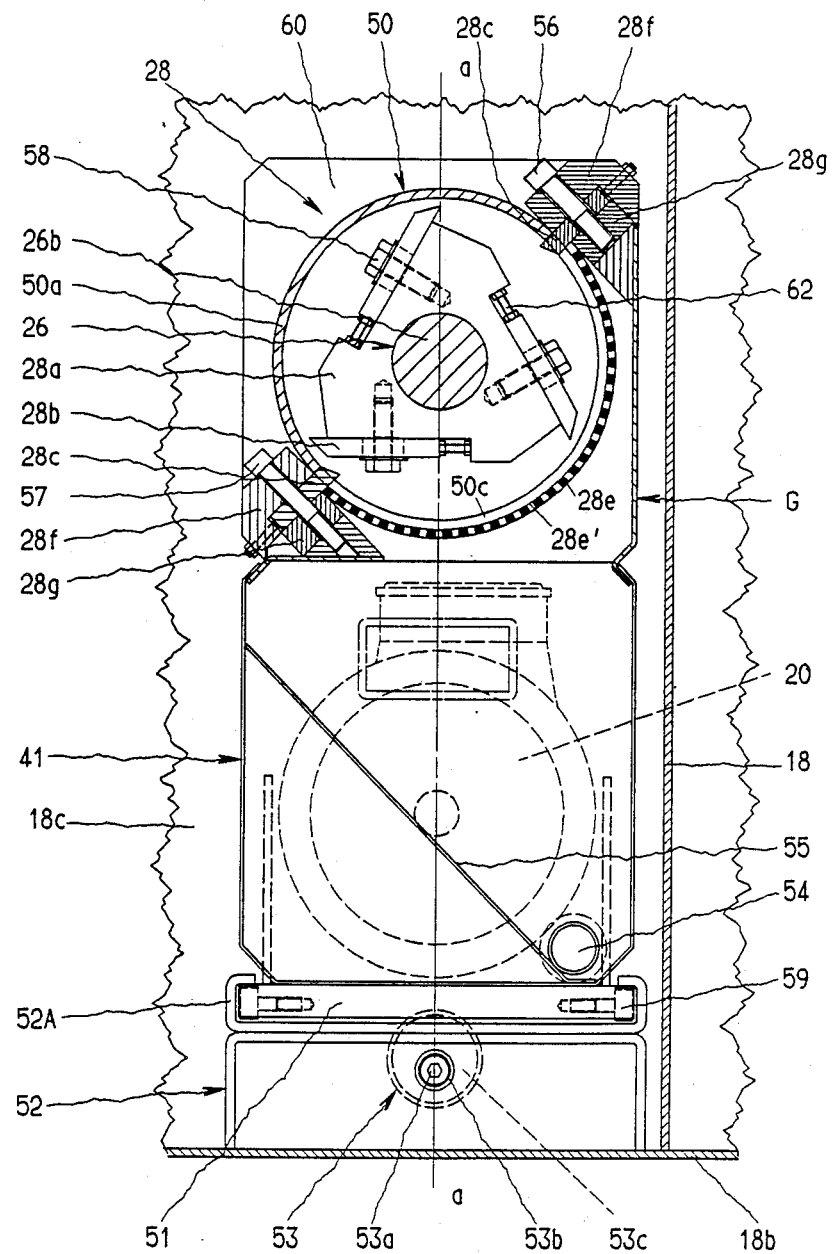
FIG. 4 shows a section from the machine pedestal in the area of the injection molding unit (G) comprising the size reduction unit, as viewed from its operator's side, the section being taken on line IV—IV of FIG. 6 and in enlarged representation.

Illustrative embodiments of the invention will now be described more in detail with reference to the drawing.

In a design according to the present invention, numerous cost saving possibilities arise both in the area of fabrication (in other words, in the manufacturing of the machine) and also with respect to the upkeep and use of the complement of machines at the customer's site. In fabrication, the design of the size reduction unit as a separate unit has been found to reduce costs because it is then independent of the fabrication and assembly of the plastics injection molding machine as such, and this benefit also occurs with the stockkeeping and the sale of the size reduction unit. In addition, there is the possibility of using the size reduction unit in plastics injection molding machines of different types, even of different sizes, provided they have a machine pedestal suitable for the insertion of the size reduction unit.

Moreover, a customer may, for example, initially procure some of his injection molding machines without the size reduction unit and purchase the associated size reduction units at a later date, when his financial resources allow. In the use of his complement of machines, the customer can still operate economically if initially only some of these injection molding machines are equipped with size reduction units—in this case, he can put correspondingly shaped containers in the spaces provided in the machine pedestals and cut up the sprues collected using a separate size reduction unit which can be used independently of the injection molding machine. The interchangeability of the size reduction unit is also advantageous in the case of changing the plastic material to be processed; in this context, several size reduction units available for different plastics may be interchanged, thus permitting to dispense with their cleaning. However, even if cleaning is necessary when changing the plastic material, the set-up time for this can be shortened substantially by exchanging the size reduction unit used with the previous plastic for a new size reduction unit. In the event of a defect in the size reduction unit, once it has been exchanged, the defective unit can be repaired without time pressure and without any appreciable operating downtime.

Unusable moldings, such as ones which are detected by a central computer which detects a variation from a production parameter, are directed into the size reduction unit. As a result, one can be assured that the moldings transported away by the conveyor belt will be of high quality and, in any event, will be usable. Since the design according to the invention avoids any need for a large space in order to set up the injection molding machine, space-saving groupings of the injection molding machines are possible in spite of the integration of the size reduction unit. Such groupings are particularly suitable for common transport systems for changing the injection molds and/or the plasticizing units.

With reference to FIG. 1, on the machine pedestal M of the injection molding machine there are arranged a horizontal clamping unit F and an injection moldung unit S, operating transversely to the parting plane c—c of the injection mold 13. The stationary platen 12 of the mold clamping unit F is arranged approximately in the middle of the machine pedestal above its transverse wall 18, which stands perpendicularly to the closing direction of the clamping unit F and which defines a reservoir 43 for the oil for the hydraulic circuit. The plasticizing cylinder 16 of the injection molding unit is displaceable on horizontal tie rods 15 and the moving platen 11 of the clamping unit F is displaceable on tie rods 14. The tie rods 14 are supported at one end on the stationary platen 12 and at the other end on a mounting plate 19 arranged above the rear wall of the pedestal M, which mounting plate carries the hydraulic drive unit 10 for the moving platen 11. The cuboid machine pedestal, made of sheet steel, is covered over the reservoir 43 by a cover 18a and otherwise by the clamping unit F. Underneath the injection mold 13 in the pedestal M is a sprue separator for separating the sprues from the moldings dropping out of the injection mold. The sprue separator comprises a mechanical switch, which comprises a horizontal shaft 35 and a sorting plate 36 with sliding surfaces on either side. The two extreme inclined positions of the sorting plate are spaced 90° apart. In one end position, the sorting plate forms a chute for the moldings dropping out, which chute terminates adjacent a conveyor belt 17 arranged symmetrically to the plane of symmetry b—b of the injection molding machine and carries the moldings out of the machine pedestal at the rear. In its other end position, the sorting plate 36 forms a chute which terminates above a size reduction unit G for the sprues. The size reduction unit comprises a cutting mechanism 28 operated by a cutter motor 20, a conveying screw 27, and a conveying barrel 50 for conveying the sprues to the cutting mechanism. The conveying screw is arranged transversely to the closing direction of the clamping unit F and is driven via gearing by the cutter motor 20. The size reduction unit further comprises a granulate container 41 arranged underneath the cutting mechanism 28. The conveyor belt 17 is arranged on that side of the size reduction unit that is remote from the injection molding unit S. The conveying screw 27 and cutting mechanism 28 have a common drive shaft (main shaft 26). The cutter motor 20 is arranged parallel to and underneath the conveying screw 27. The conveying screw 27, cutting mechanism 28, granulate container 41 and cutter motor 20 form the cuboid unit G. The width of unit G, measured in the closing direction of the clamping unit F, is determined by the diameter of the cutter motor 20 or of the screw conveyor that is formed by the conveying screw 17 and the conveying barrel 50. The motor shaft 20a and main shaft 26 lie in a common vertical plane a—a, which is the plane of symmetry of the structural unit G. The cuboid unit G adjoins the transverse wall 18 of the pedestal M which blocks off the reservoir 43.

Figure 5:
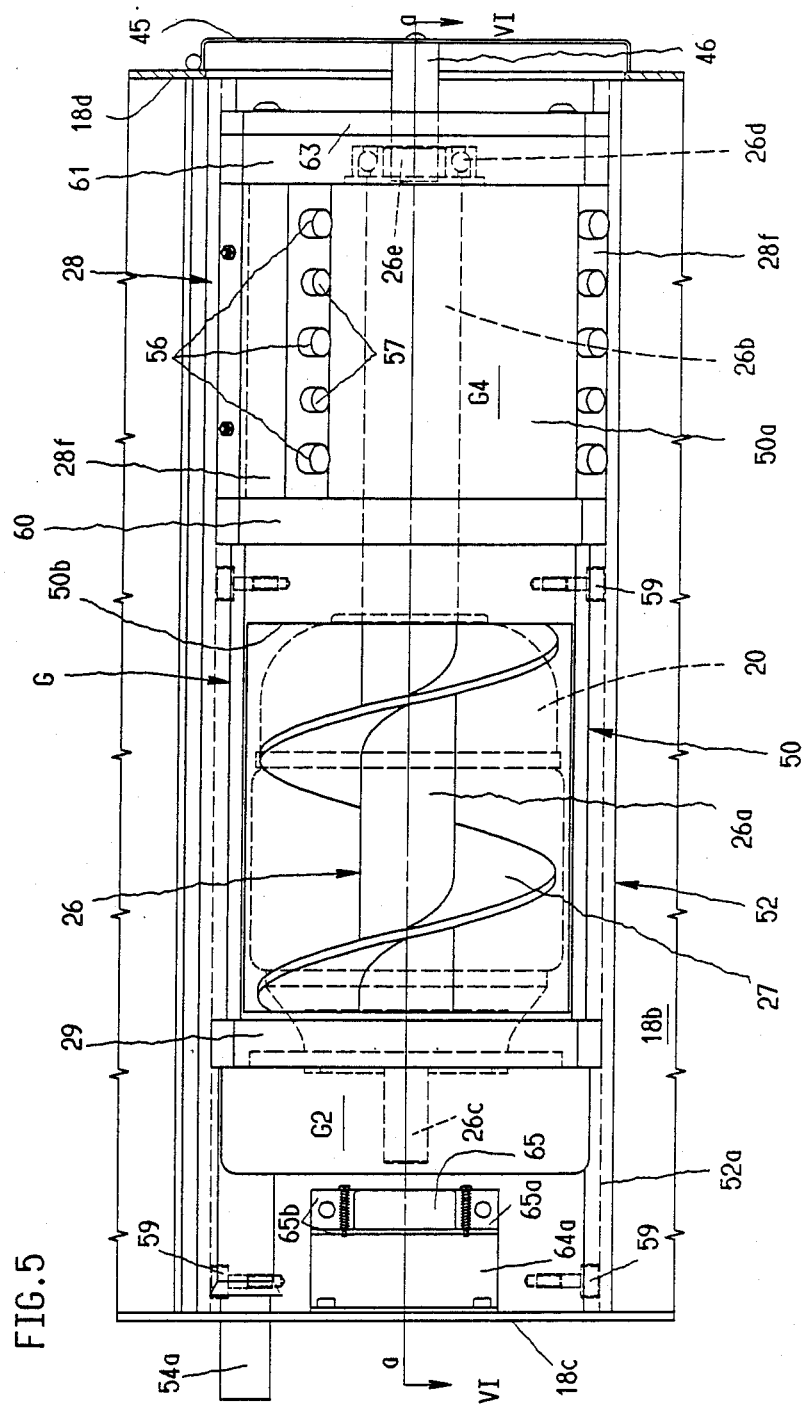
FIG. 5 is a top plan view related to FIG. 4.

With reference to FIGS. 4, 5, the plane of symmetry a—a of the unit G is approximately located in a parting plane c—c of the closed injection mold 13.

The mounting frame of the structural unit G is formed by a horizontal base plate 51, a gear plate 29 which receives the gear shafts of a transmission 24 and is rigidly connected to the base plate 51, and the conveying barrel 50 containing the conveying screw 27 which is coaxial to the main shaft 26 and fixed to the gear plate 29. The housing of the cutting mechanism 28 is thus formed by the free end portion 50a of the conveying barrel 50 containing the conveying screw 27. The gear plate 29 is supported on the motor side by a reinforcing angle element 29b, which provides an adequate load-bearing capacity for the cutting mechanism 28. The countershaft 22 of the gear 24 and rear cover plate 29a, which transfers the torque of the motor shaft 20a to the main shaft 26, lie in the plane of symmetry of the structural unit G. The cutting device 28 is axially limited by two radial flanges 60, 61 enclosing the end section 50a of the conveying barrel 50. The flanges 60, 61 are firmly connected to the shell of the conveying barrel 50. The peripheries of the flanges 60, 61 are approximately square. The knives 28b of the cutting mechanism 28 are arranged on a knife carrier 28a firmly seated on the main shaft 26. In this arrangement, they rest on corresponding bearing surfaces of the knife carrier 28a which are tangential to the main shaft 26. The knives 28b are braced against these tangential bearing surfaces by means of tightening screws 58, which are perpendicular to the knives. Set screws 62 for the knives 28b are arranged in the plane of the knives—in other words, tangential to the main shaft 26—to permit a readjustment of the knife edges of the knives 28b. The screws 62 rest with the rear of their heads against the associated knife 28b and are in threaded engagement with the knife carrier 28a. In the set position, they are secured by a nut, which rests against a shoulder of the knife carrier 28a, that shoulder is parallel to the tightening screws 58. The knives 28b cooperate with radial backing knife edges 28c. Between the radial flanges 60, 61 there are arranged bearing pieces 28f for the backing knife edges 28c. The backing knife edges 28c can be forced by means of tightening pieces 28g and tightening screws 56 against radial bearing surfaces of the bearing pieces 28f, as can be seen in particular from FIG. 4. The end section 50a of the conveying barrel 50 is equipped with a bearing flange 63, which carries a bearing for the main shaft. The flange 63 is centered in end section 50a by an axial section of smaller diameter.

The main shaft 26 has an end section 26e, with a bearing 26d, which faces the operator's side of the injection molding machine and which is mounted in the bearing flange 63 and carries the knife carrier 28a in a section adjoining the rear of the end section. Additionally, the main shaft 26 carries the conveying screw 27 in a further section 26a, which adjoins the rear of section 26b. The rear end section 26c, which is mounted in the bearing 25, constitutes the output shaft of the gear 24. The conveying barrel 50 has in the feed section a drop-in opening 50b for the plastic material to be reduced in size.

In the end section 50a, the conveying barrel 50 is provided with a drop-out opening 50c (see FIG. 4) for the comminuted plastic material. The opening 50c extends between the diametral backing knife edges 28c over a sector angle of 180°. The opening 50c is covered by a sieve 28e, which has radial sieve openings 28e'. The sieve 28e is clamped against the bearing pieces 28f at integral, radially bent edge portions by tangential tightening screws 57 and by tightening pieces 28g. The comminuted plastic material dropping through the sieve 28e can move on a chute 55, which is inclined to the vertical, to the suction nozzle 54 passing through the rear wall of the granulate container 41. The suction nozzle 54 is connected by a coaxial adapter 54b and a connection nozzle 54a passing through the rear wall 18c of the pedestal M to a suction tube (not shown) which takes the plastic material away.

Figure 6:
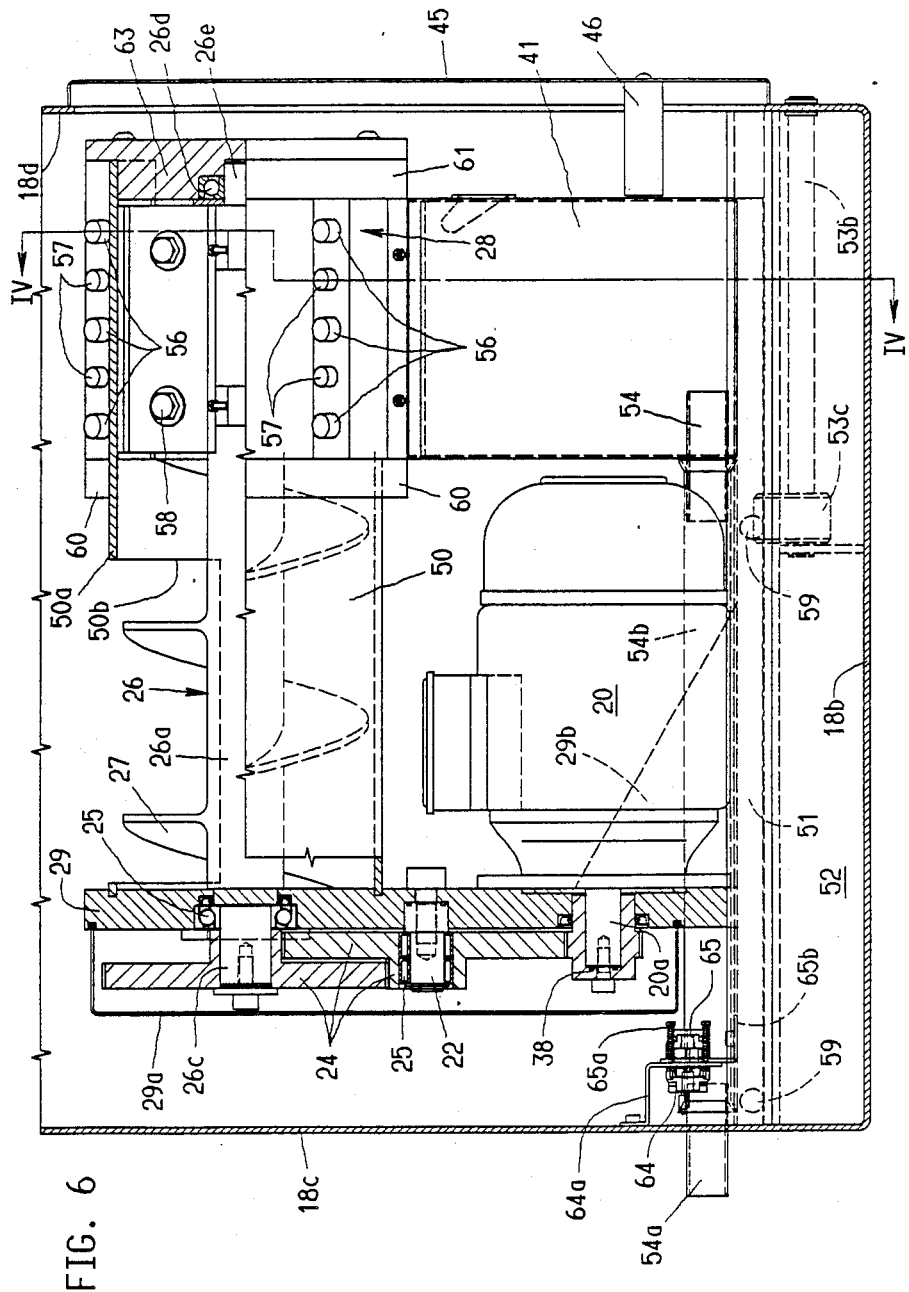
FIG. 6 shows a section taken on line VI—VI of FIG. 5.
Figure 7:
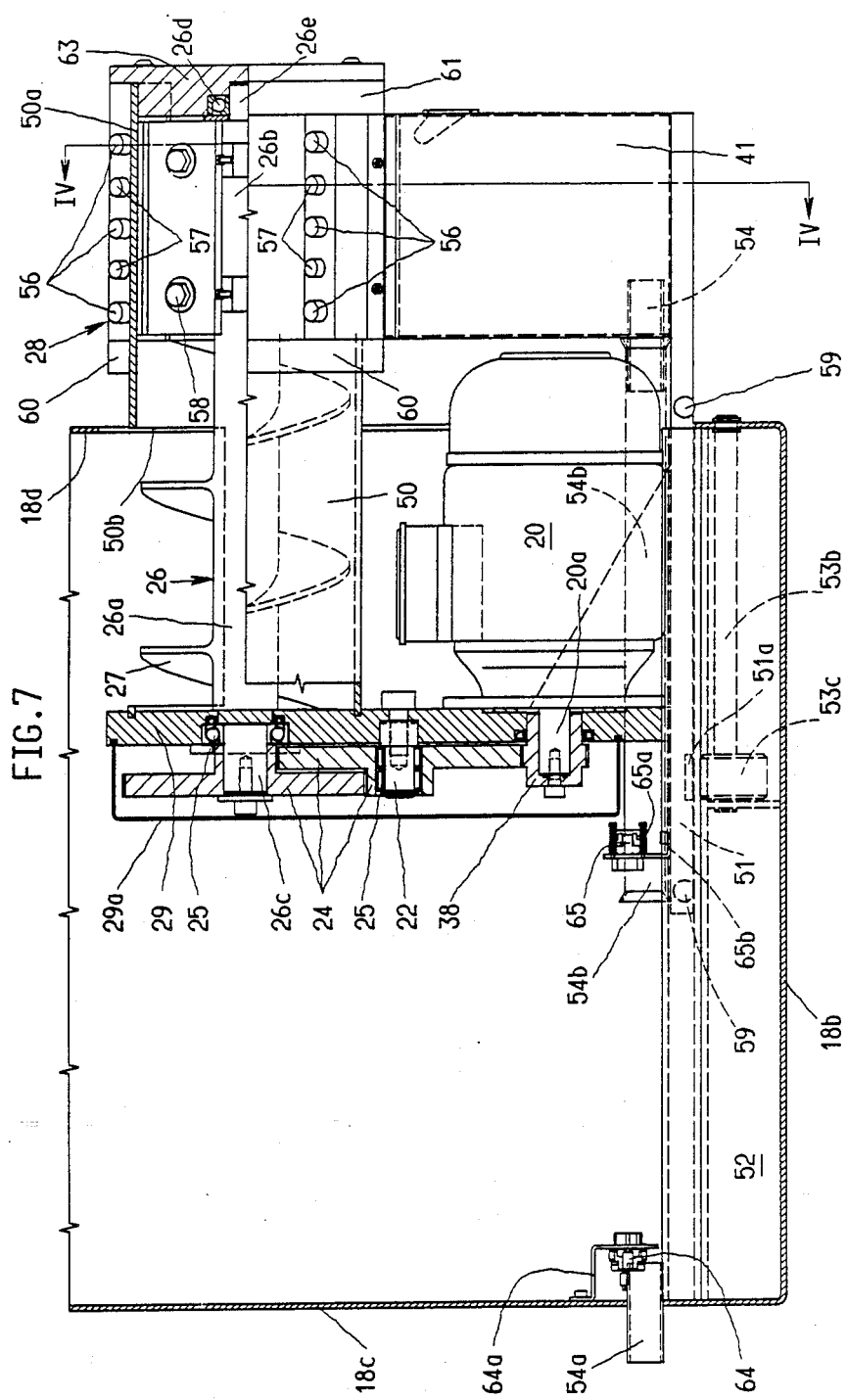
FIG. 7 shows the arrangement according to FIG. 6, with unit (G) partially withdrawn from the machine pedestal.
Figure 8:
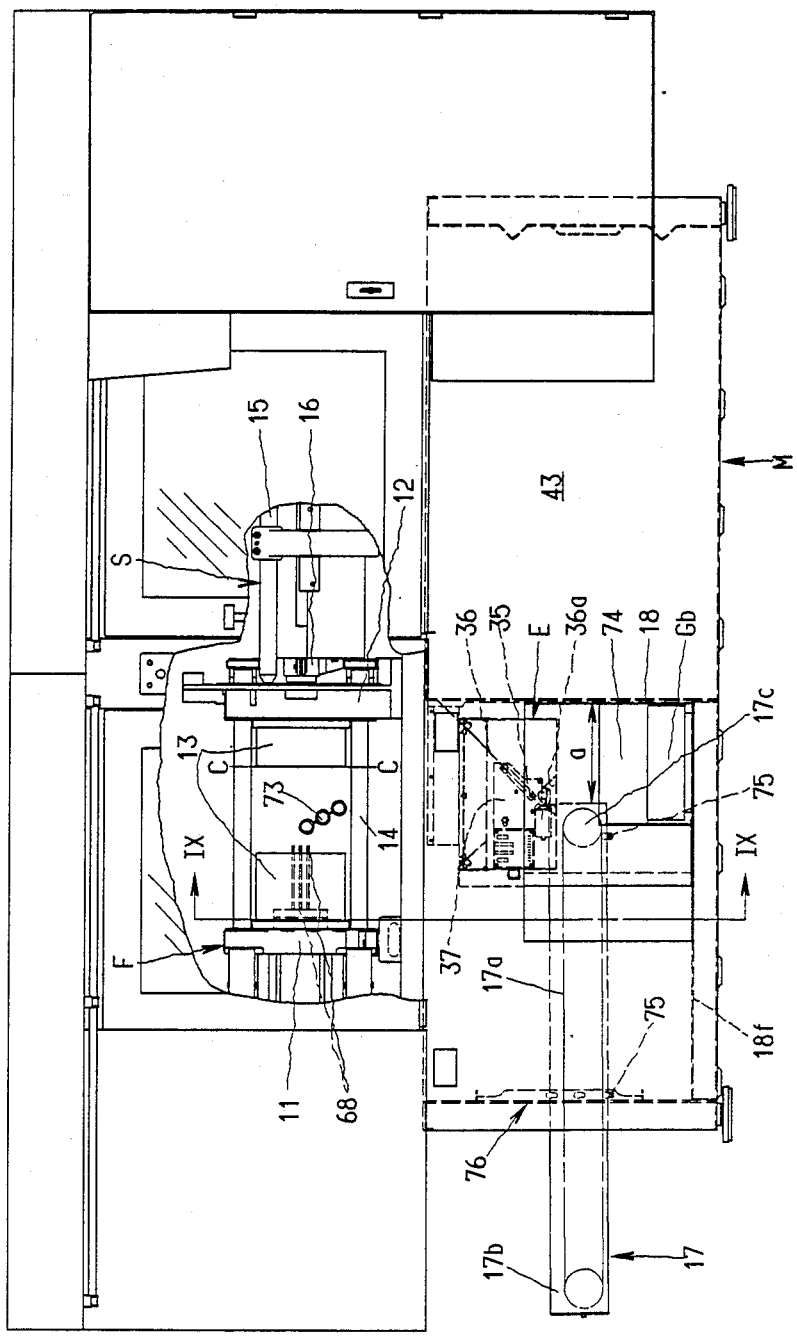
FIG. 8 is a diagrammatic side elevation showing an injection molding machine in accordance with a second illustrative embodiment comprising a container for rejects and sprues in the recycling space.
Figure 9:
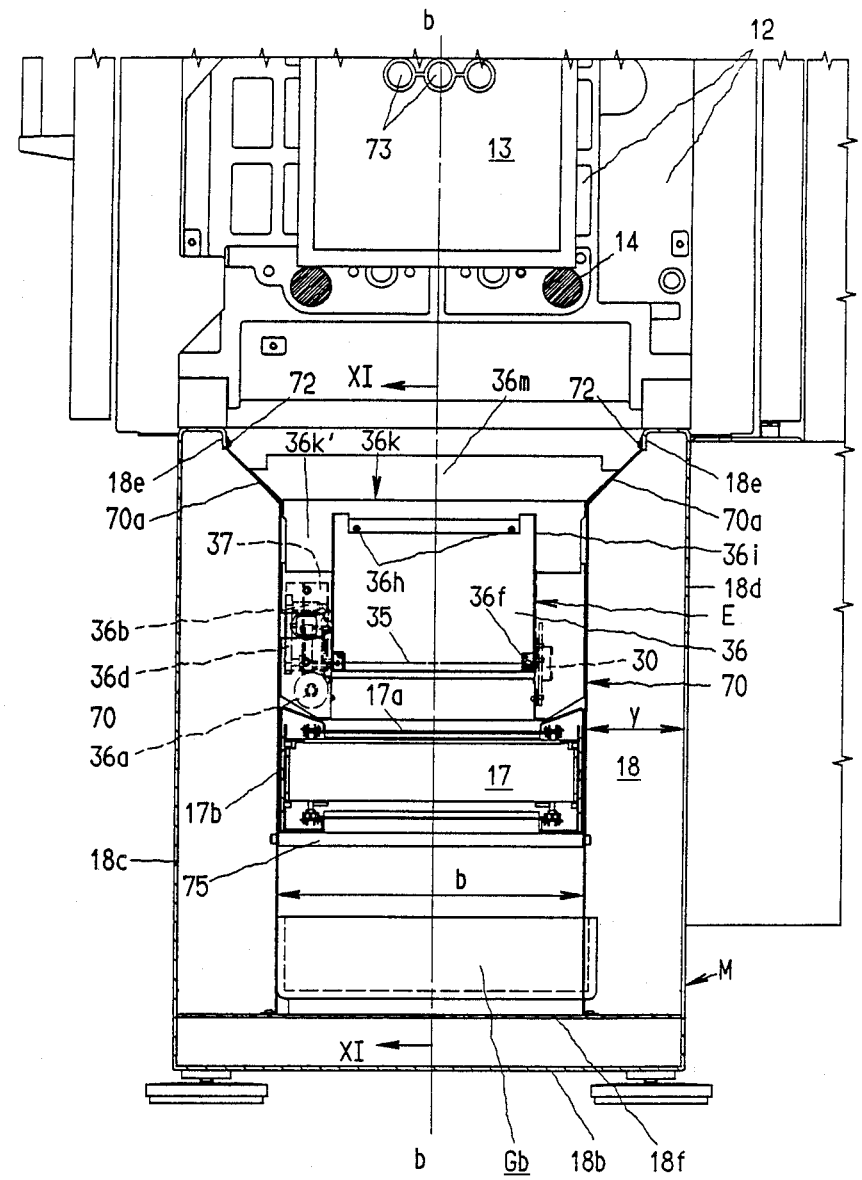
FIG. 9 is a sectional view taken on line IX—IX in FIG. 8.
Figure 10:
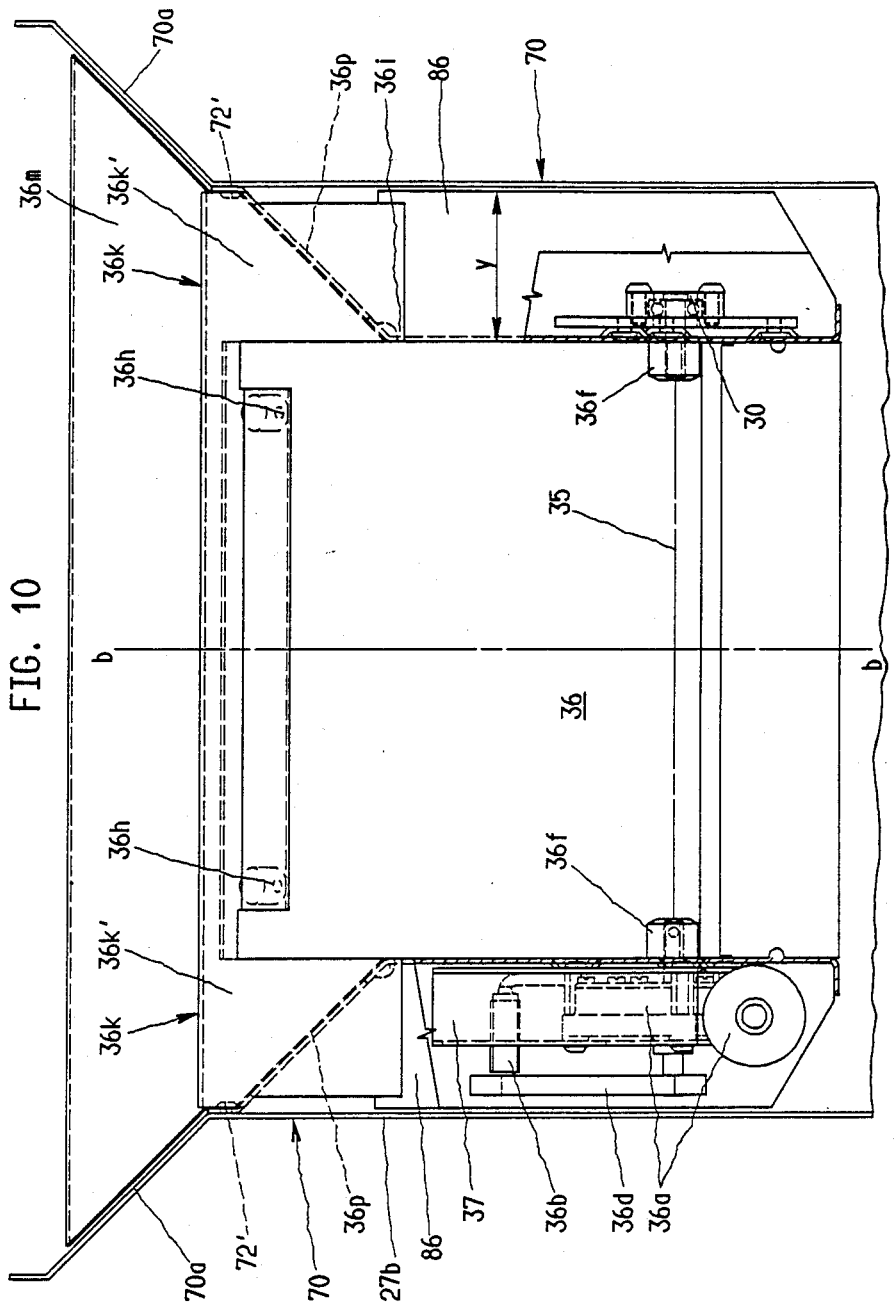
FIG. 10 is an enlarged view showing a detail of FIG. 9.
Figure 11:
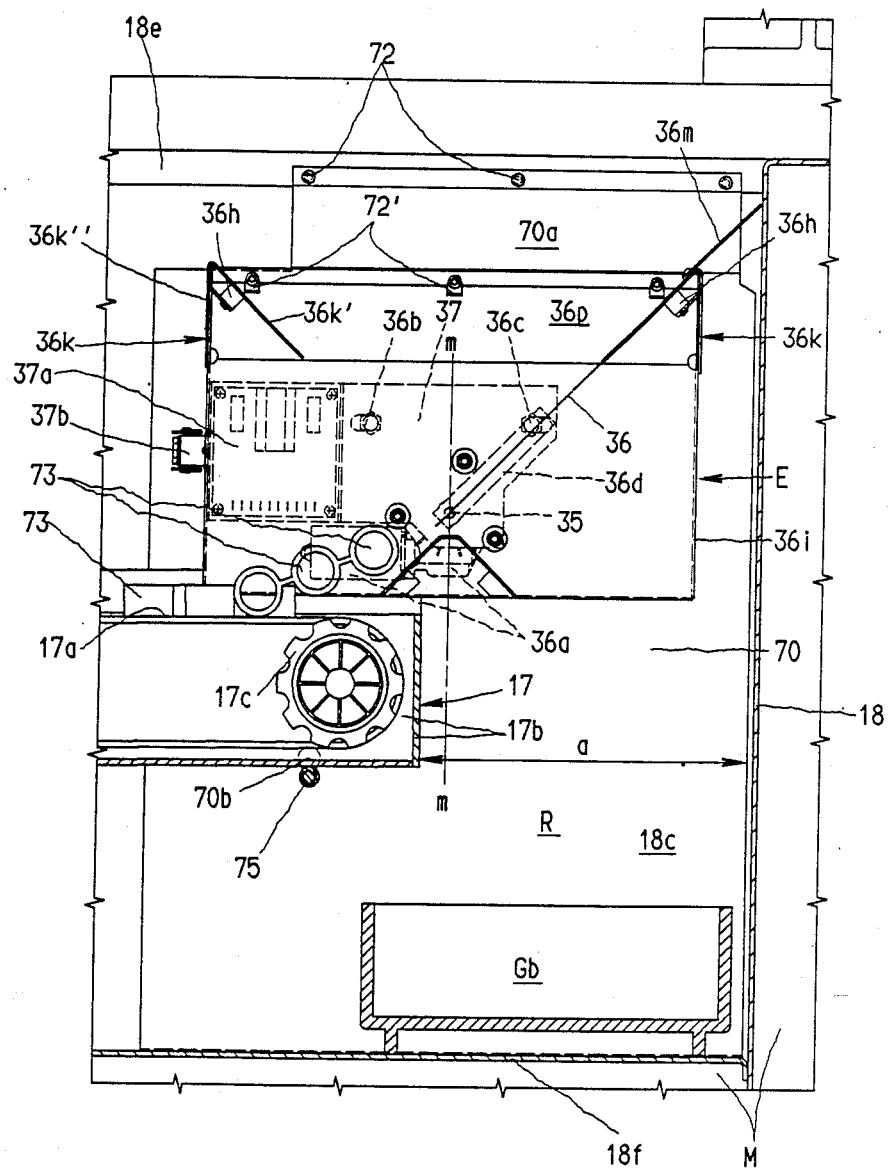
FIGS. 11 to 13 are enlarged views showing a detail of FIG. 8 with the sorting means in different operating positions.

As can be seen in particular in FIGS. 2 and 3, the structural unit G is subdivided into a drive part G1, a gear part G2, a conveying part G3 and a cutting mechanism part G4 as well as a container part G5. The structural unit G can be withdrawn, with base 18b, from the pedestal M transversely to the closing direction of the clamping unit F, by means of rollers 59 mounted in the guide part 52A of a base 52 connected to the pedestal M. For this purpose, rollers 59 are mounted on the longitudinal sides of the base plate 51. The structural unit G can be locked in operating position in the pedestal M with the aid of a locking mechanism 53. That locking mechanism 53 comprises an eccentric 53c, which serves as a locking member and is fixed to a shaft 53b that is mounted in the base 52 and extends in the plane of symmetry a—a. By a rotation of the shaft 53b by means of hexagon socket 53a, the eccentric 53c can be moved into a corresponding opening 51a of the base plate 51 to assume a locking position. The dimensions and the arrangement of the eccentric 53c are such that the eccentric 53c approaching the locking position will push the base plate 51 upward against the guide rollers of the guide part 52A, so as to axially lock the unit G. An electrical connection for the drive motor 20 can be made and broken by the insertion and withdrawal of the unit G, respectively. One contact part 64 of the connection is fixed to the rear wall 18c of the pedestal M and the other contact part 65 is fixed to the base plate 51. An angle plate 64a, which is screw-connected to the rear wall 18c, serves to fix the contact part 64, and an angle plate 65b, screw-connected to the base plate, serves to fix the contact part 65, which is spring-mounted with the aid of helical springs 65a on the vertical leg of the angle plate 65b, as can be seen in particular in FIGS. 6, 7. An opening in the wall 18d of the pedestal M on the operator's side and corresponding to the side outline of the structural unit G can be closed by a door 45. A safety switch 46 arranged on the door 45 controls the circuit of the cutter motor 20 in that upon an opening and closing of the door 45 the safety switch 46 will respectively break and make the circuit of the drive motor.

The size reduction unit and the mechanical switch (pivot 35 and plate 36) arranged in structural unit G can be controlled from the central computer of the injection molding machine in such a way that rejects which are detected by the computer are delivered directly into the size reduction unit. The granulate container 41 on the base plate 51 directly underneath the cutting mechanism is designed as a pull-out drawer with a handle. It can also be emptied manually, in which case the chute 55 is preferably removed from the granulate container 41.

The molding machine in accordance with the second embodiment of the invention will now be described with reference to FIGS. 8 to 20.

In the manner which is known from U.S. Pat. No. 3,776,675 (see particularly FIG. 2 thereof) the injection mold is provided with an ejector 68 for ejecting usable moldings 73 and unusable parts consisting of rejects 73' and/or sprues 73" at different times. Rejects are those moldings which have been detected by the computer to exceed one or more parameter limits which have been specified for the manufacture.

Figure 12:
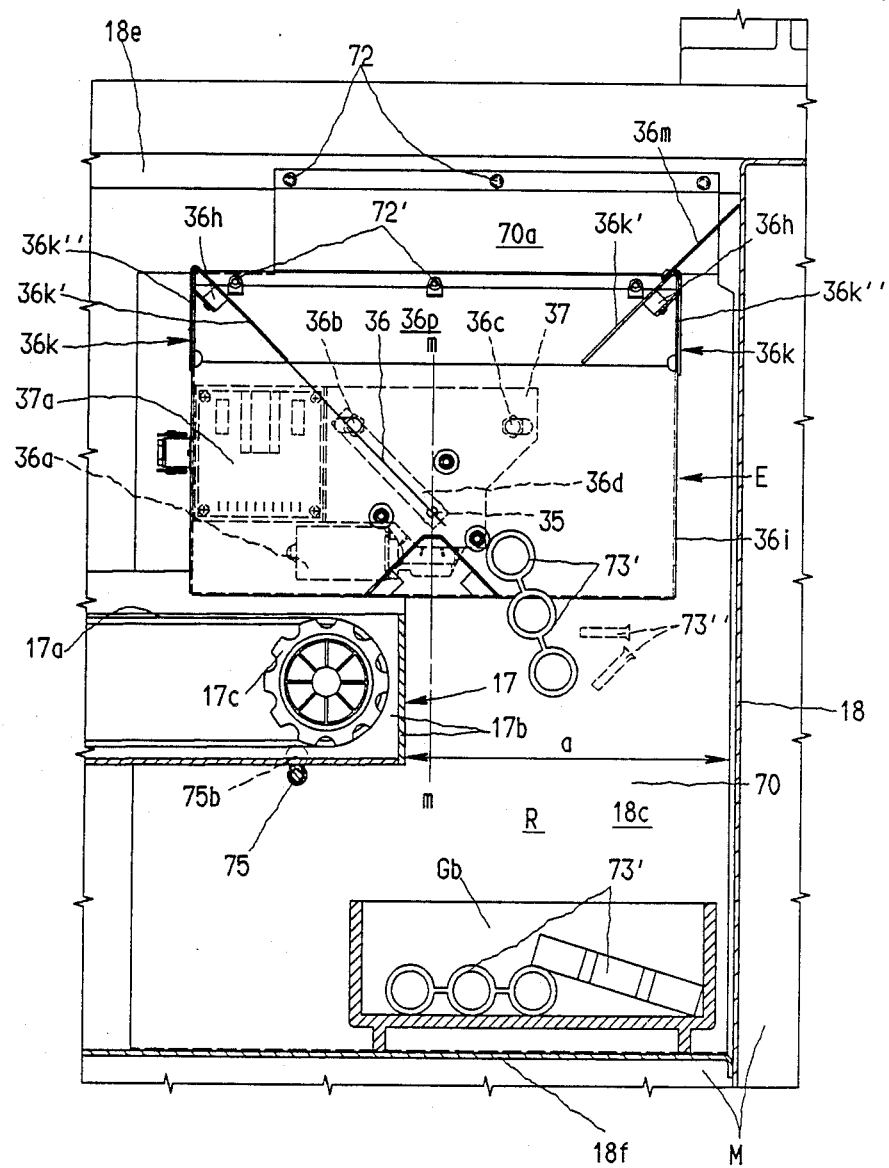
Figure 13:
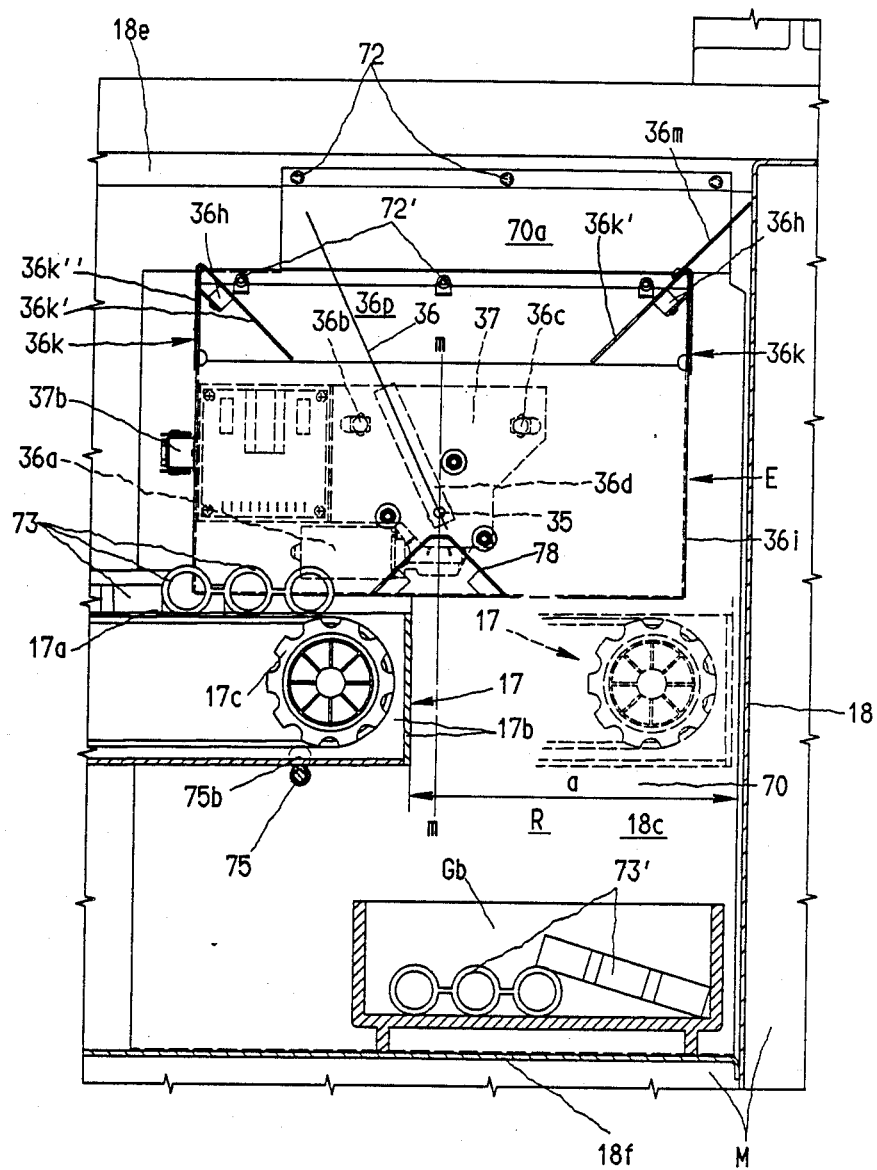

The injection mold 13 of the injection molding machine is provided with an ejector 68 (see FIGS. 8, 16) for ejecting usable moldings 73 and unusable parts (rejects 73' and/or sprues 73") at different times from the injection mold 13 when it is open (see FIG. 12). Sorting means are provided in the pedestal M of the injection molding machine under the injection mold 13. The sorting means comprise a sorting plate 36, which is mounted on a horizontal shaft 35 and provided with first and second sliding surfaces on opposite sides. The sorting plate 36 serves to spatially separate the unusable parts (rejects 73' and sprues 73") from the usable moldings 73. The sorting means also comprise a motor-driven turning mechanism 36a, 36d for turning the sorting plate 36 in the interval of time between the ejection of the usable moldings and the ejection of the unusable parts in first and second inclined positions of the sorting plate 36. Said first inclined position will be described hereinafter as a "pass" position (FIGS. 1, 8, 11, 15) for ejecting usable moldings. The second position will be described as a "reject" position (FIGS. 12, 14, 18) for ejecting unusable parts. In each inclined position the usable moldings or the rejects and sprues to be separated slip on one of the two sliding surfaces of the plate 36 to one or the other side of the shaft 35. The sorting means constitute a unit (sorting unit E), which is detachably mounted in and removable from the pedestal M of the machine and comprises a housing 36i. That unit is incorporated in the parallelepipedic pedestal M in a position in which the shaft 35 extends at right angles to the plane of symmetry b—b of the injection molding machine. Associated with the sorting unit E is a belt conveyor 17 for conveying the usable moldings 73 parallel to the plane of symmetry b—b. The belt conveyor 17 also constitutes a unit, which comprises a frame 17b and is adapted to be removed from and inserted into the pedestal M. When the sorting plate 36 is in its "pass" position, the first sliding surface of the sorting plate 36 will adjoin the conveying surface 17a of the belt conveyor 17. When the sorting plate 36 is in its "reject" position, the second sliding surface of the plate will terminate over a space (recycling space R) that is defined by a transverse wall 18. The recycling space is adapted to receive a size reduction unit, which is designated G in FIGS. 1 to 7 and G' in FIGS. 16 to 20 and which is adapted to be slidably inserted and extracted in a direction which is transverse to the plane of symmetry b—b. On that side which faces the belt conveyor 17 the recycling space R is defined by the frame 17b of the belt conveyor 17. On the side which faces the reservoir 43 the recycling space R is defined by the transverse wall 18. Elsewhere the recycling space R is defined by the longitudinal side walls 18c, 18d of the pedestal M. The longitudinal side wall 18d is formed with a sufficiently large aperture through which the size reduction unit can slidably be inserted in the embodiment of FIGS. 16 and 20 and a container Gb for rejects 73' and for sprues 73" can slidably be inserted in the embodiment shown in FIGS. 8 to 15. The size reduction unit G' or the container Gb is slidable on the bottom plate 18f of the pedestal M. The sorting unit E comprises a shielding plate 39, which is pivoted on a horizontal pivot 79 and in its shielding position has the same orientation as the sorting plate 36 in its "pass" position. As is particularly apparent from FIG. 18 the shielding plate 39 under the action of the rejects 73' and the sprues 73" falling on the shielding plate 39 is pivotally movable against the action of a spring 77. That outward pivotal movement will result in the formation of a gap 85 (FIG. 18), through which the rejects 73' and the sprues 73" can fall into the recycling space R. The sorting plate 36 extends almost entirely on one side of the shaft 35 which carries that plate. As is apparent from FIGS. 18 to 20, an angle plate 78 is provided below the shaft 35 and is symmetrical to a vertical plane m—m that extends through the shaft 35 and is provided with angled lugs 78', which are secured to the adjacent walls of the housing 36i of the sorting means E. The angle plate 78 has in cross-section approximately the configuration of a right-angled triangle and its surfaces extending at right angles to each other will be downward continuations of the operative sliding surface of the sorting plate 36 when it is in its "pass" position and in its "reject" position, respectively. The frame 17b of the belt conveyor 17 is adapted to be placed in selectable operating positions on supporting rods 75, which extend at right angles to the plane of symmetry b—b of the injection molding machine. Those operating positions differ from each other as regards the distance from the transverse wall 18. That distance may be approximately zero, as is indicated in FIG. 13 by dotted lines. The supporting rods 75 are supported in two vertical guide plates 70, which are spaced from the longitudinal side walls 18d and 18c of the pedestal M and are parallel to said side walls 18d and 18c. The distance between the two guide plates 70 corresponds to the width of the frame 17b of the belt conveyor 17. The supporting rods 75 are adapted to be inserted to and to be removed from a supporting position through introduction holes 75b, which are formed in the guide plates 70 and define a clearance with the rods 75. The frame 17b of the belt conveyor 17 is adapted to be removed from and inserted into the pedestal M through the discharge opening 76 (FIG. 8) which is provided at the end of the pedestal M and serves for the discharge of the usable moldings. The belt conveyor 17 is perfectly operable also outside the pedestal M and can thus be checked for its operative condition. When the belt conveyor 17 has been removed from the machine pedestal M, the sorting unit E can be removed from and inserted into the pedestal M through the discharge opening 76 and after the sorting unit E has been checked for its operative condition it can be returned into the pedestal M also through the discharge opening 76.

The guide plates 70 are secured by means of oblique guide portions 70a to inturned edge portions 18e of the longitudinal side walls 18c, 18d of the pedestal M. The turning mechanism for pivotally moving the sorting plate 36 essentially comprises a reversible turning motor 36a, electronic control means 37a connected to an electric plug 37b, a radially extending actuating arm 36d that is secured to the shaft 35, and limit switches 36b, 36c, which consist of proximity switches, which are responsive to inductively acting actuating means provided at the free end of the actuating arm 36d. The computer of the injection molding machine will receive corresponding signals as soon as the sorting plate 36 has reached one inclined position or the other. The turning mechanism is mounted on a mounting plate 37, which is secured to that wall of the housing 36i which is adjacent to the side wall 18c of the pedestal M. Before their installation, said parts of the turning mechanism are assembled on the mounting plate 37 outside the pedestal M and the resulting complete assembly is then arranged at the wall of the housing 36i. In its "pass" position and in its "reject" position, the free top end portion of the sorting plate 36 bears against a guide leg 36k' of an angled guide plate 36k; that guide leg is supported at its rear. The other leg 36k" of the guide plate 36k is secured to the adjacent vertical wall of the housing 36i. The guide leg 36k' is supported at its rear by a supporting element 36h, which is secured in a corresponding bent lug of the adjacent wall of the housing 36i. That guide leg 36k' which is adjacent to the transverse wall 18 is continued by a guide plate 36m extending as far as to the transverse wall 18. Each of the two vertical walls of the housing 36i which are parallel to the guide plates 70 has a top end portion, which is angled by about 45° and extends as far as to the adjacent guide plate 70 so that said top end portions 36p also constitute guiding surfaces for the falling plastic parts. The entire sorting unit E is secured by fasteners 72' to the guide plates 70 and can easily be detached therefrom. As is particularly apparent from FIG. 10 those vertical walls of the housing which are parallel to the guide plates 70 are provided with cover plates 86, which extend almost as far as to the adjacent guide plate 70. The cover plates are identical and are symmetrical with respect to the plane of symmetry b—b of the injection molding machine and by sliding on the guide plates 70 will facilitate the insertion and removal of the sorting unit E into and from the pedestal M.

As in the illustrative embodiment shown in FIGS. 1 to 7, the cutter shaft 131 of the cutting mechanism 128 of the size reduction unit G' is parallel to the output shaft 126 of the cutter motor 120. The latter drives the cutting mechanism 128 via a chain 123. It is apparent from FIGS. 18 to 20 that the cutting mechanism of the size reduction unit G' is enclosed by a channel-shaped housing 121 at the bottom and on two sides which are parallel to the transverse wall 18. The cutting mechanism 128 is confined at its ends by the two mounting flanges 128a, which have been fitted into the housing 121 and in which the cutter shaft 131 is rotatably mounted. Together with the shielding plate 39 that arrangement ensures that the recycling space will substantially be shielded from the remaining regions of the injection molding machine. Such shielding is required in view of the fact that dust will be raised in considerable quantities in the cutting mechanism 128. The cutter motor 120 and the associated transmission 124 are disposed outside the recycling space R beside the cutting mechanism and below the belt conveyor 17. The cutting mechanism 128 is designed to rotate the cutter shaft 131 at 20 to 25 revolutions per minute. At least two large knives 130a for breaking large plastic parts are provided on the shaft 131. The distance from each large knife 130a to the adjacent mounting flange 128a is equal to the spacing of the knives 130a. The other knives 130b which are mounted on the shaft 131 are relatively small. All knives 130a, 130b are non-rotatably connected to the shaft 131 by coupling bars 131a and cooperate with backing knife edges, which are constituted by diametrically arranged knife edge blocks 133. The knife edge blocks 133 are supported by a mounting block 140. During a rotation of the knives 130a, 130b they move with a sliding fit through annular passages, which are formed in the knife edge blocks 133 and in the mounting block. The material which has been crushed, disintegrated and ground by the cutting mechanism passes through the sieve 133b and a chute plate 141 to a pipe 154a, to which a vacuum is applied and through which the material is sucked out of the collecting space 154.

By the central computer of the injection molding machine, the size reduction unit G' and the sorting plate 36 can be controlled in such a manner that unusable moldings 73' will slip on the second sliding surface of the plate into the size reduction unit G' when the plate 36 is in its "reject" position.

The electric connection of the drive motor 120 to a power supply can be established in that the size reduction unit G' is inserted and can be eliminated in that said unit is extracted.

Figure 14:
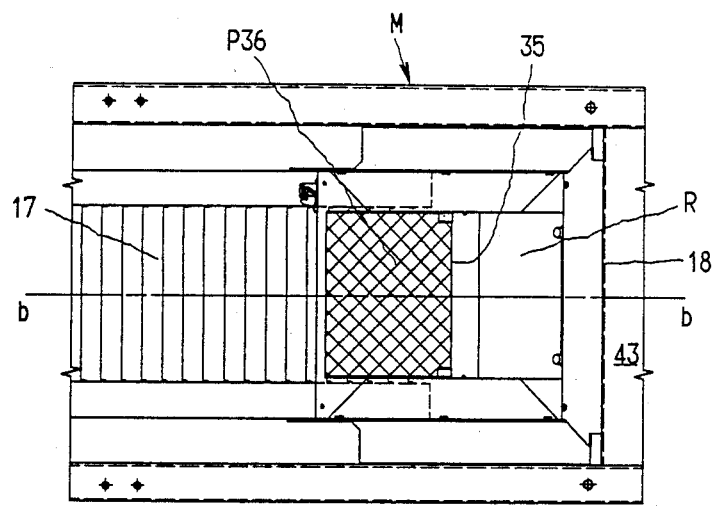
FIGS. 14 and 15 are diagrams illustrating the sorting means in positions for ejecting usable moldings and unusable parts.
Figure 15:
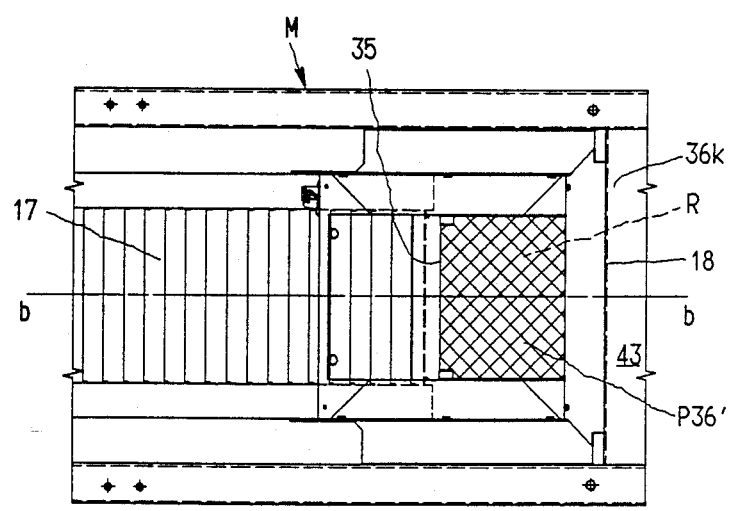
Figure 16:
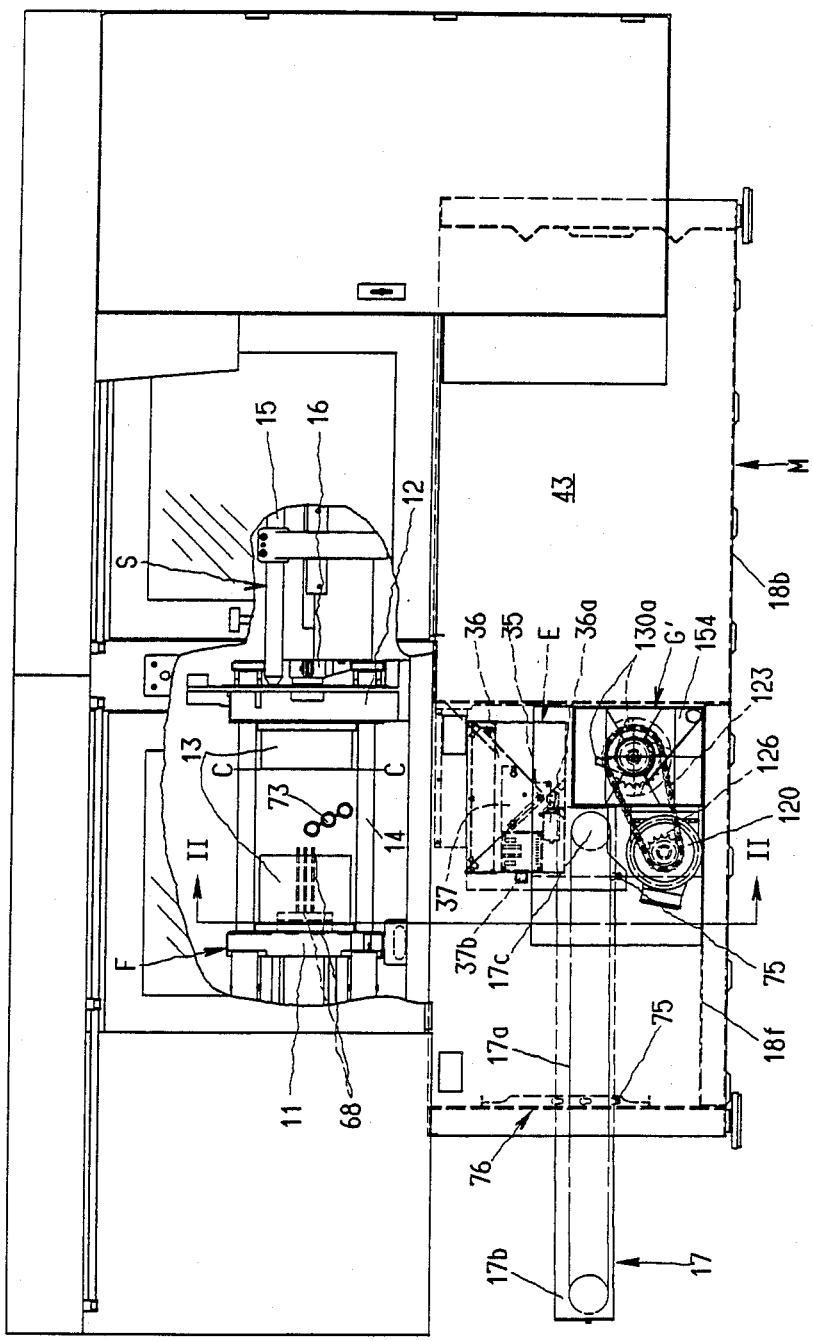
FIG. 16 is an injection molding machine as shown in FIG. 8 provided with a size reduction unit in the recycling space.
Figure 17:
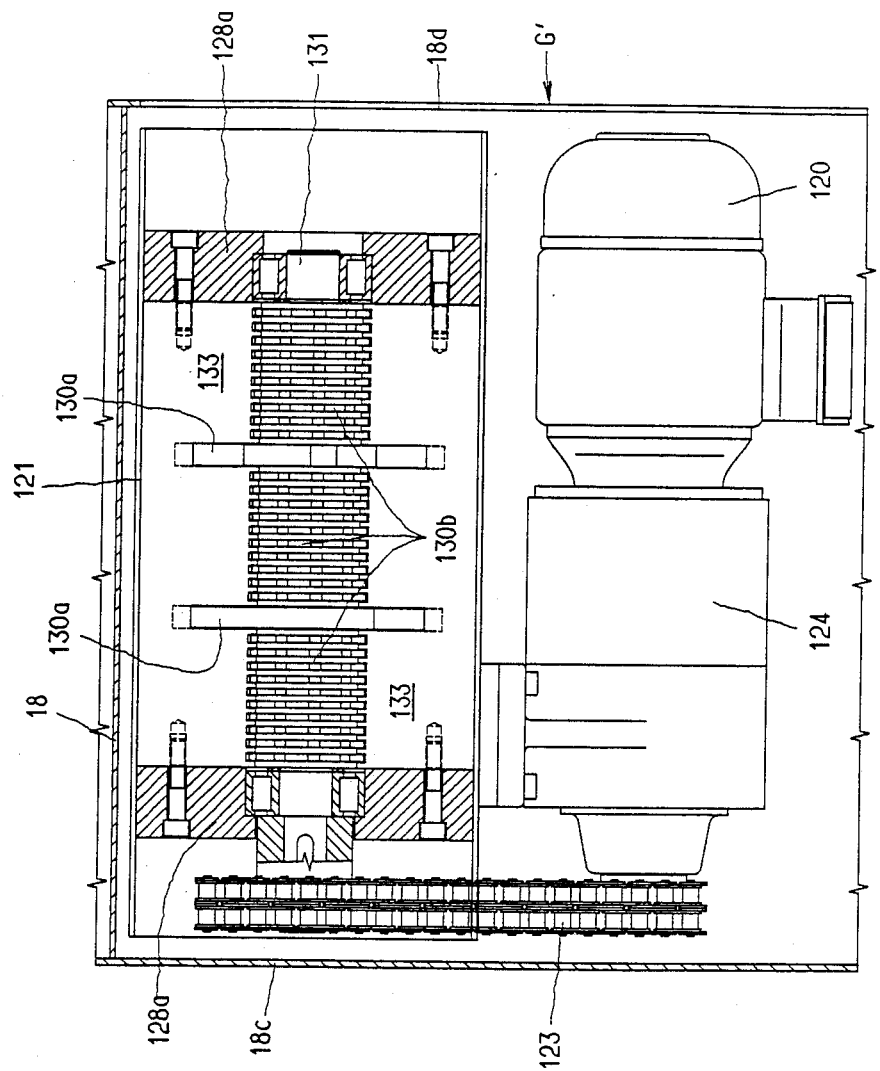
FIG. 17 is an enlarged top plan view showing the size reducting unit of FIG. 16.
Figure 18:
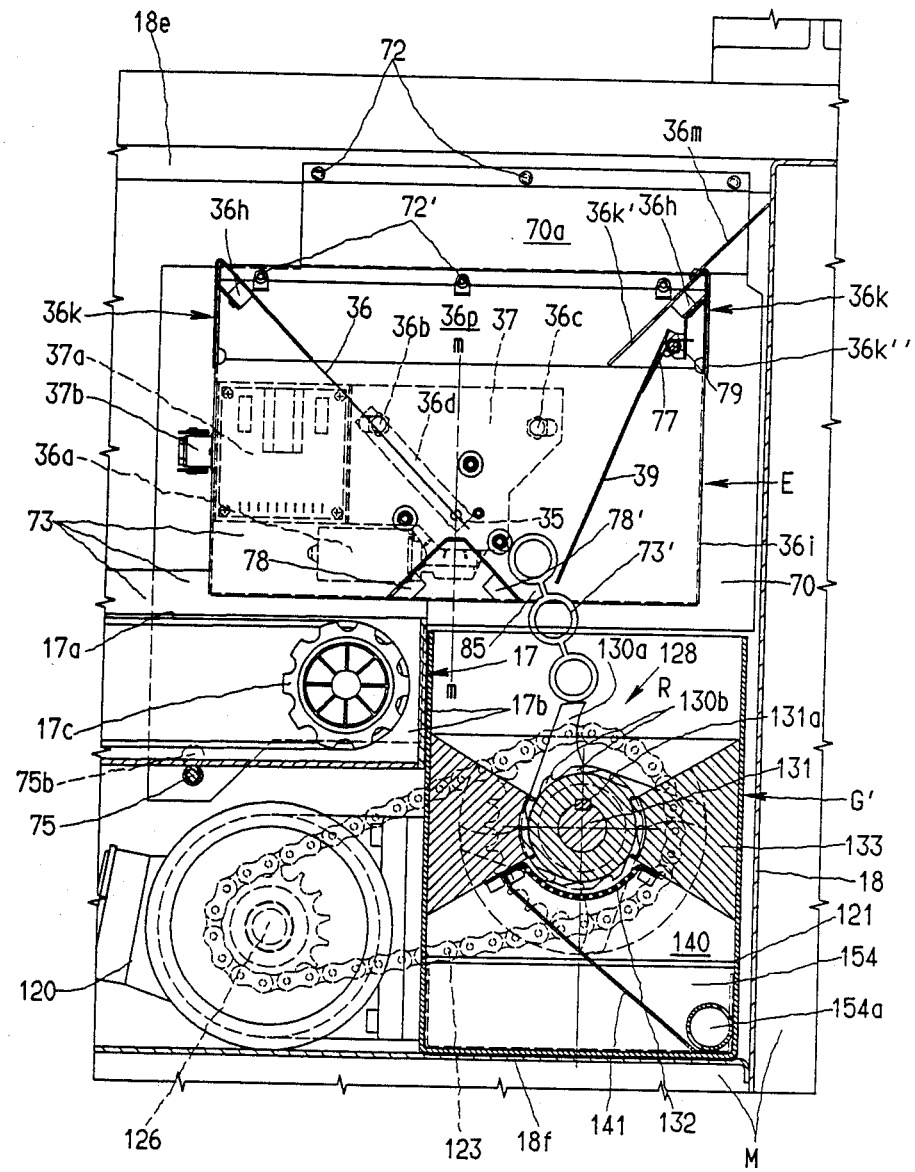
FIGS. 18 to 20 are enlarged views showing a detail of FIG. 16 with the sorting means in a different operating position and, in FIG. 20, in a sectional view taken on a different section plane through the cutting mechanism.
Figure 19:
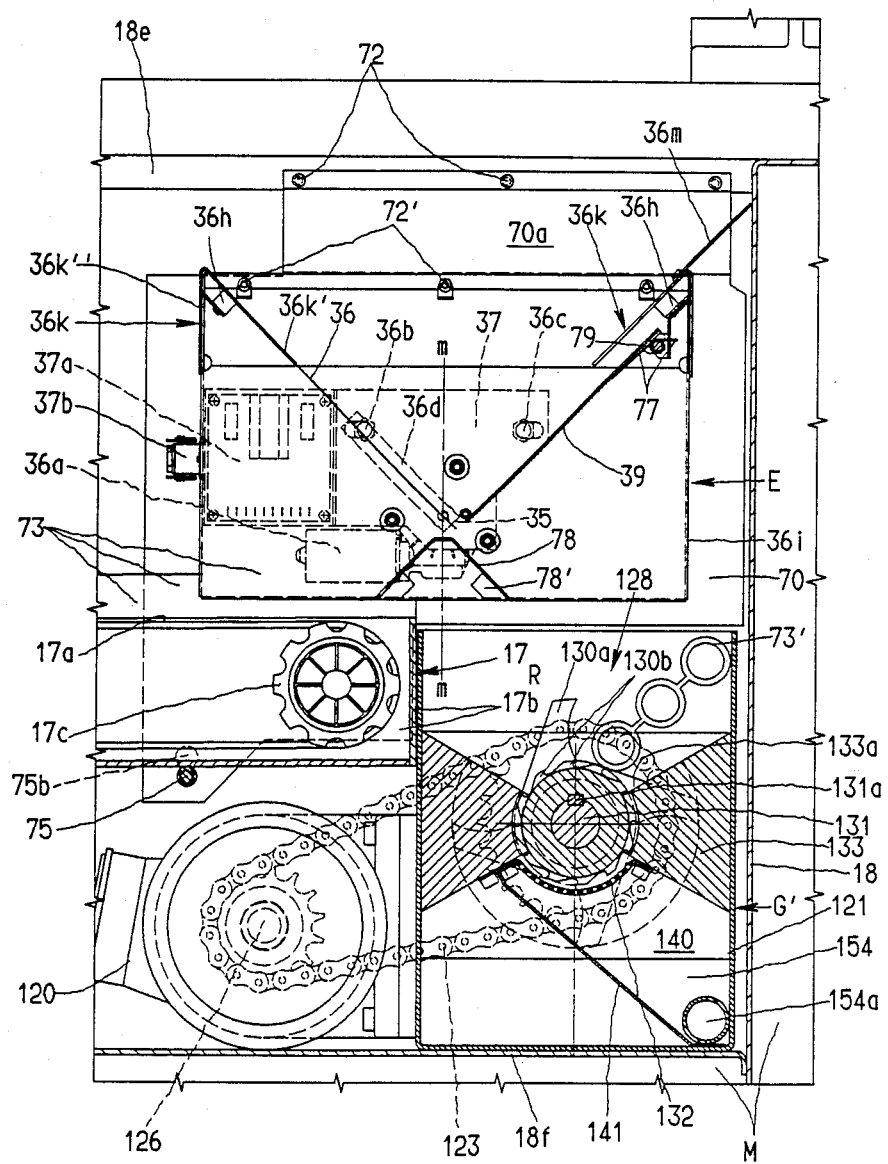
Figure 20:
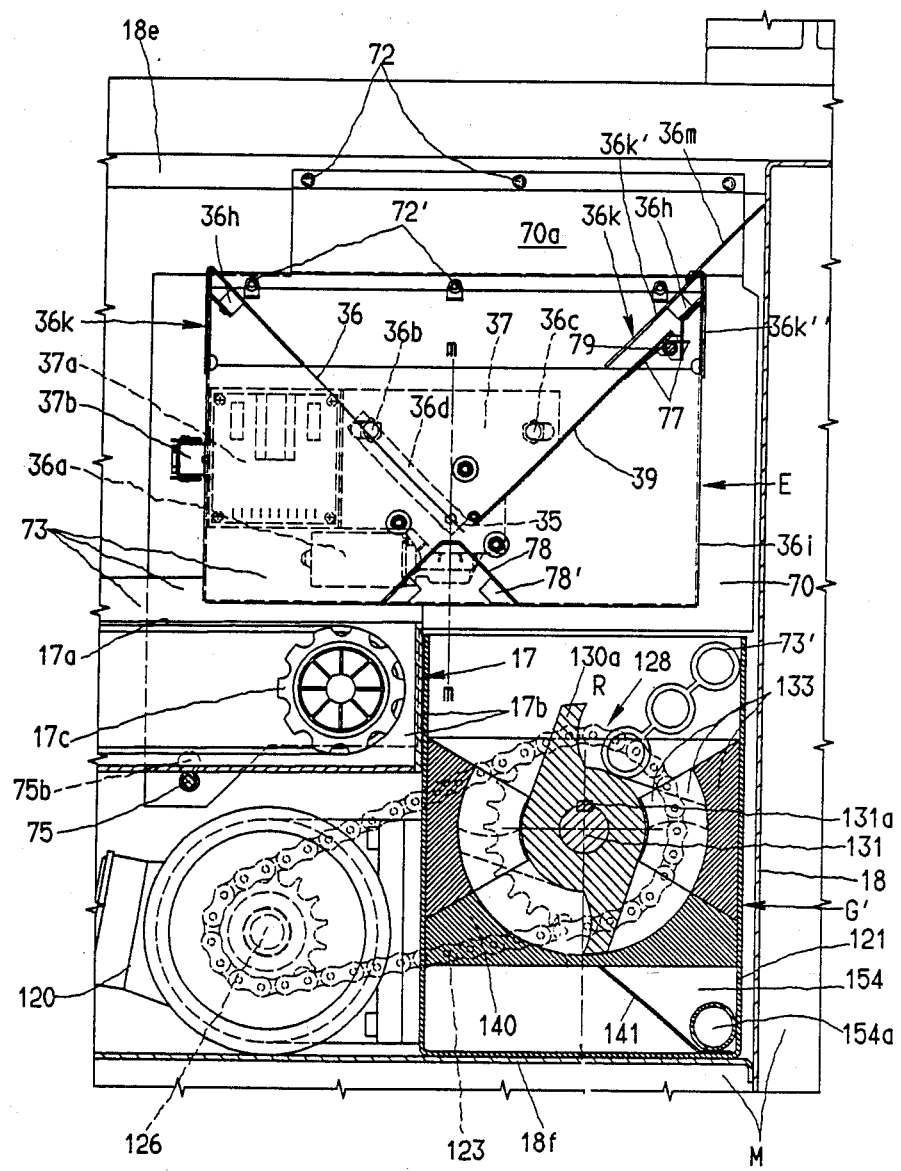

The diagrammatic FIGS. 14 and 15 represent the vertical projection of the sorting plate 36 when it is in its "reject" position (FIG. 14) and the vertical projection P36' of the sorting plate in its "pass" position as a crosshatched area. The projection are P36 in FIG. 14 lies substantially on the left of the shaft 35 and the projection area 36' in FIG. 15 is substantially on the right of the shaft 35. As a result, the access to the recycling space R is sufficiently open when the sorting plate 36 is in its "reject" position. The first sliding surface of the sorting plate in its "pass" position adjoins the conveying surface 17a of the belt conveyor 17 and is continued by the surface of the angle plate 78.

I claim:

1. In an injection molding machine having a vertical longitudinal plane of symmetry and comprising:

a pedestal adapted to be supported on an approximately rectangular undersurface, a horizontal injection molding unit, which is mounted on said pedestal and adapted to contain an injection mold, which is adapted to be opened and closed, a horizontal clamping unit mounted on said pedestal and operable to clamp said mold in said injection molding unit, an ejector for ejecting usable moldings and unusable parts from said mold in said injection molding unit when said mold is open, and sorting means, which are mounted in said pedestal under said injection mold in said injection molding unit and comprise:

a housing, pivotal mounting means mounted in said housing and defining a horizontal pivotal axis, a sorting plate, which is mounted in said housing on said pivotal mounting means for a pivotal movement between first and second inclined positions, which respectively constitute a "pass" position and a "reject" position, which sorting plate is provided on mutually opposite sides with a first sliding surface, which is downwardly inclined and arranged to receive usable moldings from said ejector and to deliver said usable moldings on one side of said pivotal axis when said sorting plate is in said "pass" position, and a second sliding surface, which is arranged to receive unusable parts from said ejector and to deliver said unusable parts on the other side of said pivotal axis when said sorting plate is in said "reject" position, and power-operated turning means for pivotally moving said sorting plate from said "pass" position to said "reject" position and from said "reject" position to said "pass" position, the improvement residing in that said pedestal is generally parallelepipedic, said sorting means constitute a sorting unit, which is detachably mounted in said pedestal with said pivotal axis extending at right angles to said plane of symmetry of the injection molding machine, a belt conveyor unit is detachably mounted in said pedestal and arranged to receive usable moldings from said sorting plate when it is in said "pass" position, which belt conveyor has a conveying surface which adjoins said first sliding surface when said sorting plate is in said "pass" position, said pedestal comprises a transverse wall, which defines in said pedestal an open-topped recycling space, and said second sliding surface has a lower end, which is arranged to be disposed over said recycling space when said sorting plate is in said "reject" position.

2. The improvement set forth in claim 1, wherein a size reduction unit which is detachably mounted in said pedestal is disposed in said recycling space, is arranged to receive said unusable parts from said second sliding surface when said sorting plate is in said "reject" position, and is slidably mounted for a movement out of said pedestal in a direction which is at right angles to said plane of symmetry.

3. The improvement set forth in claim 2, wherein said pedestal comprises a longitudinal rear wall, said turning means comprise a reversible turning motor having an output shaft, said size reduction unit comprises a cutting mechanism including a cutter shaft and a cutter motor having an output shaft, which is parallel to said output shaft of said turning motor, and said output shaft of said cutter motor is operatively connected to said cutter shaft by a transmission which is mounted on said rear longitudinal side wall.

4. The improvement set forth in claim 2, wherein said injection molding machine comprises a computer for detecting each unusable molding having a parameter which exceeds a predetermined limit and for controlling said turning means in response to the detection of such unusable molding to move said sorting plate to its "reject" position.

5. The improvement set forth in claim 2, wherein said size reduction unit comprises a cutter motor and terminal means are provided for connecting said cutter motor to an electric power supply when, and only when, said size reduction unit is in a predetermined position in said recycling space.

6. The improvement set forth in claim 2, wherein said size reduction unit comprises a cutting mechanism including a cutter shaft, said size reduction unit also comprises a U-shaped housing and mounting flanges enclosing said cutting mechanism, said cutter shaft is rotatably mounted in said flanges, and a cutter motor is provided, which is disposed outside said recycling space beside said cutting mechanism and below said belt conveyor and operatively connected to said cutter shaft.

7. The improvement set forth in claim 6, wherein said cutting mechanism comprises a cutter shaft, said cutter motor is operable to drive said cutter shaft at a speed of 20 to 25 r.p.m., said cutter shaft carries at least two spaced apart large knives for breaking large plastic parts, each of said large knives is disposed adjacent to one of said flanges and is spaced from said respective one flange by a distance which is equal to the spacing of said large knives, a plurality of small knives are mounted on said cutter shaft, and stationary backing knife edges are provided on diametrically spaced apart knife edge blocks and arranged to cooperate with all said knives, said knife edge blocks being coupled with said U-shaped housing.

8. The improvement set forth in claim 1, wherein said belt conveyor comprises a frame, said pedestal comprises longitudinal side walls, said recycling space is defined by said frame and by said side walls, and one of said side walls is formed with an aperture that communicates with said recycling space.

9. The improvement set forth in claim 8, wherein a reject container which is detachably mounted in said pedestal is disposed in said recycling space and is arranged to receive said unusable parts from said second sliding surface when said sorting plate is in said "reject" position, and said reject container is adapted to be removed from said pedestal through said aperture.

10. The improvement set forth in claim 8, wherein a size reduction unit which is detachably mounted in said pedestal is disposed in said recycling space and is arranged to receive said unusable parts from said second sliding surface when said sorting plate is in said "reject" position, and said size reduction unit is adapted to be removed from said pedestal through said aperture.

11. The improvement set forth in claim 1, wherein
said sorting unit comprises a shielding plate, which is pivoted on a horizontal axis and is movable to a shielding position and in said shielding position has the same orientation as the sorting plate when it is in said "pass" position;

said shielding plate when it is in said shielding position is arranged to receive unusable parts falling from said second sliding surface when said plate is in said "reject" position and said shielding plate in said shielding position is arranged to perform in response to the impact of said unusable parts on said shielding plate a pivotal movement to a gap-defining position, in which said shielding plate defines with said housing a downwardly extending gap, which is open to said recycling space, and spring means are provided, which urge said shielding plate to said shielding position.

12. The improvement set forth in claim 1, wherein
said sorting plate has a major part that is disposed on one side of said pivotal axis and an angle plate is provided, which has first and second inclined surfaces, which are arranged to be disposed adjacent to and to constitute a downward continuation of said first and second sliding surfaces, respectively, of said sorting plate when the latter is in said "pass" and "reject" positions, respectively.

13. The improvement set forth in claim 1, wherein
said pedestal contains supporting rods, which extend at right angles to said plane of symmetry, said belt conveyor unit comprises a frame and said pedestal contains a plurality of supporting rods, which extend at right angles to said plane of symmetry and are adapted to support said frame in any of a plurality of operating positions in which said frame is spaced different distances from said transverse wall.

14. The improvement set forth in claim 13, wherein
said pedestal comprises two mutually opposite vertical longitudinal walls and contains two vertical guide plates, which are inwardly spaced from and parallel to adjacent ones of said longitudinal walls and are horizontally spaced a distance apart by a distance which is equal to the width of said frame, said supporting rods are supported by said guide plates, and said guide plates are formed with introduction holes adapted to receive said supporting rods with a clearance in order to facilitate the movement of said supporting rods to and from a supporting position in said guide plates.

15. The improvement set forth in claim 14, wherein
said longitudinal walls have inturned edge portions and said guide plates have oblique guide portions, which are secured to said inturned edge portions.

16. The improvement set forth in claim 1, wherein
said pedestal is formed at one end with a discharge opening, which adjoins said recycling space, said belt conveyor unit extends through said discharge unit, and said sorting unit and said belt conveyor unit are adapted to be moved into and out of said recycling space through said discharge opening.

17. The improvement set forth in claim 1, wherein
an actuating arm is non-rotatably connected to said sorting plate, said turning means comprise limit switches, which are operable by said actuating arm, and a turning motor which is controlled by said limit switches, said turning means are mounted on a mounting plate, said pedestal comprises two transversely spaced apart longitudinal side walls, said housing comprises a wall that is adjacent to one of said side walls, and said mounting plate is mounted on said wall of said housing.

18. The improvement set forth in claim 1, wherein
said housing comprises two laterally spaced apart vertical walls, two angled guide plates are provided, each of which is associated with one of said vertical walls and has a first leg, which bears on said associated vertical wall, and a second leg, which protrudes into said housing and has a rear surface facing the associated vertical wall, each of said vertical walls carries a supporting element bearing on the rear surface of the second leg of the associated guide plate, said sorting plate is mounted on said pivotal mounting means adjacent to the lower end of said sorting plate and has a free top end portion, said second legs of said guide plates are arranged to support said top end portion of said sorting plate when the latter is in its "pass" and "reject" positions, respectively, and an extension guide plate is carried by each of said second legs and extends as far as to said transverse wall.

19. The improvement set forth in claim 1, wherein
said pedestal comprises two mutually opposite vertical longitudinal walls and contains two vertical guide plates, which are inwardly spaced from and parallel to adjacent ones of said longitudinal walls and are horizontally spaced a distance apart by a distance which is equal to the width of said frame, said housing comprises two mutually opposite walls, which are parallel to said guide plates and each of which comprises a top end portion, which constitutes a guiding surface and includes an angle of about 45° with the adjacent one of said guide plates, and said end portions are readily detachably secured to said guide plates by fasteners.

20. The improvement set forth in claim 1, wherein
said pedestal comprises two mutually opposite vertical longitudinal walls and contains two vertical guide plates, which are inwardly spaced from and parallel to adjacent ones of said longitudinal walls and are horizontally spaced a distance apart by a distance which is equal to the width of said frame, said housing comprises two mutually opposite walls, which are parallel to said guide plates and each of which carries a centering plate, which extends approximately as far as to the adjacent one of said guide plates.

* * * * *